July 8, 1924.  
E. GUGGENHEIM  
MEAT TENDERER  
Filed Oct. 23, 1923

1,500,811

INVENTOR.  
EZEKIEL GUGGENHEIM  
BY Stockbridge & Borst.  
ATTORNEYS

Patented July 8, 1924.

1,500,811

UNITED STATES PATENT OFFICE.

EZEKIEL GUGGENHEIM, OF CHARLOTTE, NORTH CAROLINA.

MEAT TENDERER.

Application filed October 23, 1923. Serial No. 670,267.

*To all whom it may concern:*

Be it known that I, EZEKIEL GUGGENHEIM, a citizen of the United States, residing at Charlotte, in the county of Mecklenburg and State of North Carolina, have invented certain new and useful Improvements in Meat Tenderers, of which the following is a full, clear, and exact description.

This invention relates to meat tenderers and has for an object to provide an improved machine of this type which is readily portable; which will more effectively make the meat tender without mutilating it; which is adaptable for operation upon steaks of different thicknesses and of any area; and which is compact, light, simple, and relatively inexpensive. Other objects and advantages will be apparent from the following description of an embodiment of the invention, and the novel features will be particularly pointed out hereinafter in claims.

Figure 1:
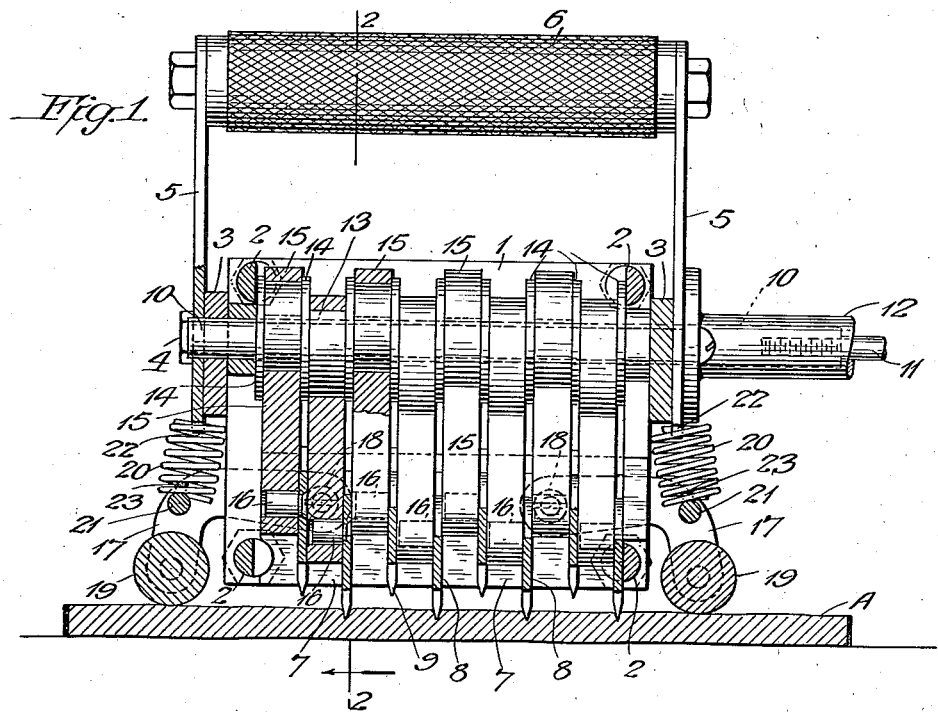
Figure 2:
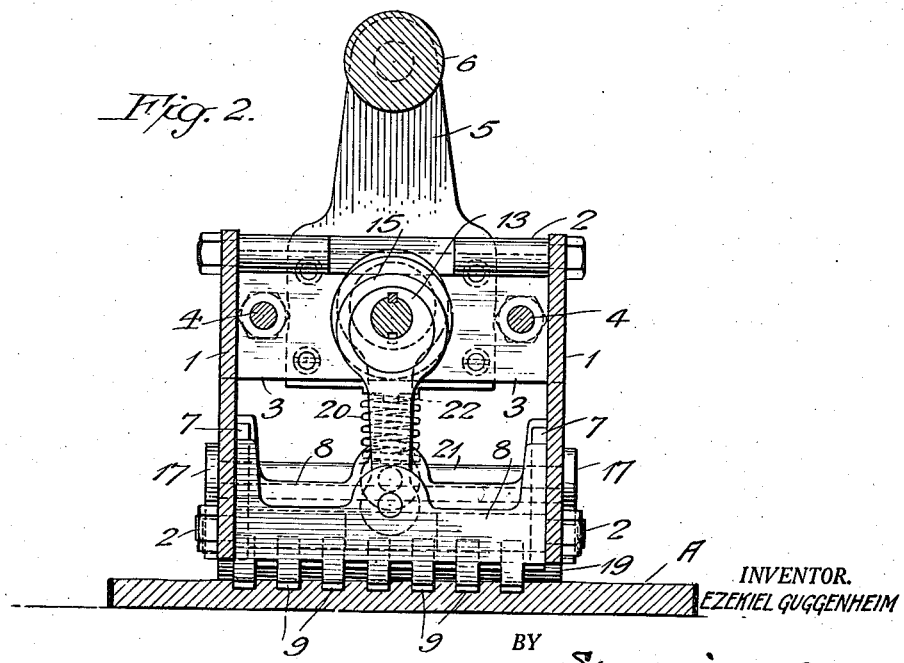

In the accompanying drawing:

Fig. 1 is a longitudinal sectional elevational of a device constructed in accordance with the invention; and Fig. 2 is a transverse sectional elevation of the same, taken substantially along the line 2—2 of Figure 1.

In the illustrated embodiment of the invention, a pair of side plates 1 are connected together in parallel spaced relation by means of bolts 2 located adjacent the upper and lower edges at the ends thereof, and end or cross plates 3 are connected to the side plates and held against separation from one another by longitudinally extending bolts 4. The side and end plates connected in this manner serve as the frame for the device. Arms 5 are secured in any suitable manner to the end or cross plates 3 so as to extend upwardly therefrom and support between them a suitable handle 6, by which the device may be lifted, carried about, and when in use pushed over the surface of the steak to be made tender.

A plurality of strips 7 are secured in a vertical spaced relation along the inner faces of the side plates 1 so as to form, in the spaces between those on each plate, guideways for a plurality of plates 8. The plates 8 are adapted to slide in the opposing grooves in the frame, in parallel relation to one another, and each plate is provided upon its lower edge with a plurality of tines or piercing points 9. The tines or piercing points of each plate are preferably in staggered relation to the tines or piercing points of the next adjacent plate on each side thereof.

A shaft 10 extends lengthwise of the device and is rotatably supported in the end plates 3. A flexible operating cable 11 is connected to one end of the shaft 10 for rotating the same, and is preferably provided with a flexible protector 12, as usual in flexible driving cables. A plurality of eccentric cams 13 are keyed, or otherwise suitably secured, upon the shaft 10 between the end or cross plates 3, with suitable washers or spacers 14 interposed between the cams and between the cams and end plates 3.

A pitman 15 is provided upon each eccentric cam and extends downwardly along a face of one of the blades 8. Each pitman is pivotally connected at its lower end by a pin 16 to one of the plates, and the eccentric cams are preferably arranged with their throws alternately on opposite sides of the shaft so that when the shaft is rotated the adjacent plates will be given reciprocations in alternate directions.

Arms 17 are connected by pivot pins 18 to each side plate 1, one at each end thereof, and extend beyond the ends of the frame on each side. The arms 17 at each end of the frame mount between them, for rotation, a suitable roller 19 as illustrated in Figure 1. A compression spring 20 is interposed between a cross bar 21, connecting the arms 17 mounting each roller, and the end plate 3. These springs 20 tend to yieldingly press the arms 17 in directions to carry the rollers 19 downwardly until the arms engage with the heads of the cross connecting bolts 2 which are at the lower part of the frame. Each compression spring also abuts against the lower end of each handle arm 5, the latter having a tongue 22 depending therefrom into the spring for preventing disengagement of the spring therefrom. Each of the cross bars 21 may also have a pin 23 extending into the abutting spring so as to prevent disengagement of the spring from the cross bar.

In the operation of the device, the shaft 11 is rotated from any suitable source of power, and in rotating drives the shaft 10 carrying the eccentric cams. The eccentric cams cause alternate reciprocations of the plates 8. The operator grasps the frame by the handle 6, places the device upon the surface of a steak A to be made tender, and presses downwardly thereon. The rollers in engaging with the steak are yieldingly shifted upwardly against the action of the springs 20 as the frame descends, and the tines or piercing points 9 when projected downwardly by the eccentric cam of the pitman will then pierce the steak and expose the fibres thereof to the action of heat when the steak is cooked. At the same time the device is rolled over the surface of the steak slowly, so that the tines or piercing points will, in successive operations, pierce different portions of the surface of the steak. Therefore, as the device is rolled back and forth over the surface of the steak, practically the entire surface of the steak will be pierced by the tines 9 of the plates.

The depth to which the steak will be pierced will depend upon the downward pressure which is applied through the handle 6 as the device is rolled over the steak, it being understood that with greater pressure the rollers will be elevated and allow the tines to sink into the steak to greater extents. In case the steak is very thick, it may be necessary or desirable to operate upon both surfaces of the steak with this device.

It will be understood, of course, that the shaft 20 may be operated by a crank handle or in any other suitable manner. It will also be understood that various other changes in the details and arrangements of parts, herein described and illustrated for the purpose of explaining the nature of the invention, may be made by those skilled in the art within the principle and scope of the invention as expressed in the appended claims.

Claims:

1. A meat tenderer comprising a frame, a plurality of plates slidable vertically in said frame and each having on its lower edge a plurality of piercing points, a shaft carried by the frame, means for rotating the shaft, and means operated from the shaft for reciprocating the plates vertically whereby a steak, over which the frame is moved, will be repeatedly pierced by the points of the plates.

2. A meat tenderer comprising a frame, a plurality of plates slidable vertically in said frame and each having on its lower edge a plurality of piercing points, a shaft carried by the frame, means for rotating the shaft, means operated from the shaft for reciprocating the plates vertically whereby a steak, over which the frame is moved, will be repeatedly pierced by the points of the plates, and rollers carried by the frame for guiding it over the steak while the latter is being pierced by the plates.

3. A meat tenderer comprising a frame, a plurality of plates slidable vertically in said frame and each having on its lower edge a plurality of piercing points, a shaft carried by the frame, means for rotating the shaft, means operated from the shaft for reciprocating the plates vertically whereby a steak, over which the frame is moved, will be repeatedly pierced by the points of the plates, rollers carried by the frame for guiding it over the steak while the latter is being pierced by the plates, and spring means for yieldingly urging the rollers downwardly to lift the frame upwardly and decrease the depth to which the points of the plates will pierce.

4. A meat tenderer comprising a frame, a plurality of plates slidable vertically in said frame and each having on its lower edge a plurality of piercing points, a shaft carried by the frame, means for rotating the shaft, means operated from the shaft for reciprocating the plates vertically whereby a steak, over which the frame is moved, will be repeatedly pierced by the points of the plates, rollers carried by the frame for guiding it over the steak while the latter is being pierced by the plates, spring means for yieldingly urging the rollers downwardly to lift the frame upwardly and decrease the depth to which the points of the plates will pierce, and a handle on the frame for moving the tenderer over a steak and pressing it downwardly to determine the depth of piercing by the points of the plates.

5. A meat tenderer comprising a frame, a plurality of plates slidable vertically in said frame and each having on its lower edge a plurality of piercing points, a shaft carried by the frame, means for rotating the shaft, means operated from the shaft for reciprocating the plates vertically whereby a steak, over which the frame is moved, will be repeatedly pierced by the points of the plates, and rollers carried by the frame for guiding it over the steak while the latter is being pierced by the plates, the points of each plate being staggered relatively to the next adjacent plates whereby the entire surface of a steak beneath the plates will be pierced as the frame moves over it.

6. A meat tenderer comprising a frame, a plurality of plates slidable vertically in said frame and each having on its lower edge a plurality of piercing points, a shaft carried by the frame, means for rotating the shaft, a plurality of eccentric cams secured on said shaft, and pitman articulately connected to said plates and operated by said cams whereby the plates will be positively reciprocated by the rotation of the shaft.

7. A meat tenderer comprising a frame, a plurality of plates slidable vertically in said frame and each having on its lower edge a plurality of piercing points, a shaft carried by the frame, means for rotating the shaft, means operated from the shaft for reciprocating the plates vertically whereby a steak, over which the frame is moved, will be repeatedly pierced by the points of the plates, a plurality of rollers hinged to said frame by arms so as to be bodily movable vertically relatively to the frame, and spring devices for yieldingly forcing the arms in directions to carry the rollers downwardly and lessen the depth to which the points of the plates will pierce.

In witness whereof, I hereunto subscribe my signature.

EZEKIEL GUGGENHEIM.